United States Patent
Unrath

(10) Patent No.: US 9,931,713 B2
(45) Date of Patent: Apr. 3, 2018

(54) LASER SYSTEMS AND METHODS FOR AOD ROUT PROCESSING

(71) Applicant: ELECTRO SCIENTIFIC INDUSTRIES, INC., Portland, OR (US)

(72) Inventor: Mark A. Unrath, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 725 days.

(21) Appl. No.: 14/211,115

(22) Filed: Mar. 14, 2014

(65) Prior Publication Data

US 2014/0263201 A1    Sep. 18, 2014

Related U.S. Application Data

(60) Provisional application No. 61/791,361, filed on Mar. 15, 2013.

(51) Int. Cl.
*B23K 26/08*    (2014.01)
*B23K 26/082*   (2014.01)

(52) U.S. Cl.
CPC ........ *B23K 26/082* (2015.10); *B23K 26/0853* (2013.01)

(58) Field of Classification Search
CPC .............. B23K 26/0807; B23K 26/082; B23K 26/0853; G02F 1/33; G05B 2219/45041
See application file for complete search history.

(56) References Cited

U.S. PATENT DOCUMENTS 5,012,069 A * 4/1991 Arai .................. B23K 26/0853
                                                    219/121.62
5,841,099 A   11/1998 Owen et al.
6,433,301 B1   8/2002 Dunsky et al.
(Continued)

FOREIGN PATENT DOCUMENTS

JP    02-030388 A * 1/1990
JP    2003136270 A    5/2003
(Continued)

OTHER PUBLICATIONS

Machine translation of JP-02-030,388, Aug. 2017.*
(Continued)

*Primary Examiner* — Geoffrey S Evans

(57) ABSTRACT

Laser systems and methods improve the processing velocity of the routs or other features to avoid exceeding the laser system's dynamic limits. A laser processing system divides laser processing commands corresponding to a plurality of features to be processed on or in the workpiece into process segments. Laser processing parameters and beam trajectories are simulated to determine a maximum processing velocity for each of the process segments. The laser processing system selects one or more of the maximum processing velocities for processing the plurality of features on or within the workpiece. A slowest processing velocity of the maximum processing velocities may be used to process each of the plurality of features. Alternatively, each continuous rout sequence may be processed using a different processing velocity. In other embodiments, each process segment is processed using its corresponding maximum processing velocity.

10 Claims, 6 Drawing Sheets

(56) References Cited

U.S. PATENT DOCUMENTS

| | | | |
|---|---|---|---|
| 6,676,878 B2 | 1/2004 | O'Brien et al. | |
| 6,706,999 B1 | 3/2004 | Barrett et al. | |
| 7,133,186 B2 | 11/2006 | Johnson | |
| 7,244,906 B2 | 7/2007 | Jordens et al. | |
| 7,259,354 B2* | 8/2007 | Pailthorp | H05K 3/0026 |
| | | | 219/121.71 |
| 7,425,471 B2 | 9/2008 | Bruland et al. | |
| 7,817,319 B2 | 10/2010 | Pinard et al. | |
| 8,026,158 B2 | 9/2011 | Bruland et al. | |
| 8,288,679 B2 | 10/2012 | Unrath et al. | |
| 8,404,998 B2 | 3/2013 | Unrath et al. | |
| 8,541,099 B2 | 9/2013 | Fujii et al. | |
| 8,680,430 B2 | 3/2014 | Unrath | |
| 2002/0023903 A1* | 2/2002 | Ann Ngoi | B08B 7/0042 |
| | | | 219/121.68 |
| 2005/0128553 A1 | 6/2005 | Toyama et al. | |
| 2005/0270631 A1 | 12/2005 | Johnson | |
| 2006/0027544 A1 | 2/2006 | Pailthorp et al. | |
| 2006/0039057 A1 | 2/2006 | Han et al. | |
| 2008/0029491 A1* | 2/2008 | Johnson | B23K 26/0853 |
| | | | 219/121.6 |
| 2008/0192250 A1 | 8/2008 | Yoo et al. | |
| 2009/0206066 A1* | 8/2009 | Rekowski | B23K 26/082 |
| | | | 219/121.81 |
| 2010/0140237 A1* | 6/2010 | Unrath | B23K 26/0807 |
| | | | 219/121.72 |
| 2010/0155381 A1* | 6/2010 | Kuhl | B23K 26/082 |
| | | | 219/121.72 |
| 2010/0252959 A1 | 10/2010 | Lei et al. | |
| 2010/0301023 A1 | 12/2010 | Unrath et al. | |
| 2011/0100966 A1 | 5/2011 | Nagatomo et al. | |
| 2011/0210103 A1 | 9/2011 | Bruland et al. | |
| 2011/0220623 A1* | 9/2011 | Beutler | B23K 26/0876 |
| | | | 219/121.67 |
| 2012/0083049 A1* | 4/2012 | Johnson | B23K 26/0853 |
| | | | 438/4 |
| 2012/0273472 A1 | 11/2012 | Unrath et al. | |

FOREIGN PATENT DOCUMENTS

| | | |
|---|---|---|
| JP | 2008-49383 A | 3/2008 |
| JP | 2008168297 A | 7/2008 |
| WO | WO2009087392 A1 | 7/2009 |
| WO | WO-2011/131933 A1 * | 10/2011 |

OTHER PUBLICATIONS

Notification of Transmittal of the International Search Report and the Written Opinion of the International Searching Authority, or the Declaration for PCT/US2014/027275, dated Jul. 30, 2014.

* cited by examiner

LASER SYSTEMS AND METHODS FOR AOD ROUT PROCESSING

RELATED APPLICATION

This application claims the benefit under 35 U.S.C. § 119(e) of U.S. Provisional Application No. 61/791,361, filed Mar. 15, 2013, which is hereby incorporated by reference herein in its entirety.

TECHNICAL FIELD

This disclosure relates generally to laser processing apparatuses and to methods of processing workpieces using the same.

BACKGROUND INFORMATION

Laser-processing of features (e.g., through-vias, blind vias, trenches, routs, kerfs, and other features) within one or more materials of a workpiece can be processed using parameters such as laser power, pulse repetition frequency (PRF), pulse energy, pulse width, bite size, and other parameters. In many laser processing applications, the speed or efficiency with which a feature is formed, and the quality of the feature ultimately formed, can be very sensitive to such processing parameters.

An example application in a compound motion laser processing machine is the processing of "rout" features: laser cut lines made up of sequential linear or circular arc segments. Traditionally, such processing is accomplished by moving the process beam at a constant velocity along a desired trajectory. For a given laser power and PRF, this provides a consistent fluence and bite size at the worksurface.

However, it is possible to exceed the dynamic limits (e.g., linear stage acceleration or velocity, or galvo scan field) of a compound motion system when processing routs. For certain rout velocities, for example, a rout that reverses direction can easily produce peak linear stage acceleration beyond the system's capability.

SUMMARY OF THE DISCLOSURE

Embodiments of the present disclosure, as examples described herein, address the limitations discussed above and other limitations associated with conventional methods of laser processing routs and other features in a workpiece. Certain embodiments optimize or improve the processing velocity of the routs or other features to avoid exceeding the laser system's dynamic limits.

In one embodiment, a laser processing system divides laser processing commands corresponding to a plurality of features to be processed on or in the workpiece into process segments. Laser processing parameters and beam trajectories are simulated to determine a maximum processing velocity for each of the process segments. The laser processing system selects one or more of the maximum processing velocities for processing the plurality of features on or within the workpiece.

In one embodiment, a slowest processing velocity of the maximum processing velocities is used to process each of the plurality of features. In another embodiment, each continuous rout sequence is processed using a different processing velocity. In other embodiments, each process segment is processed using its corresponding maximum processing velocity.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
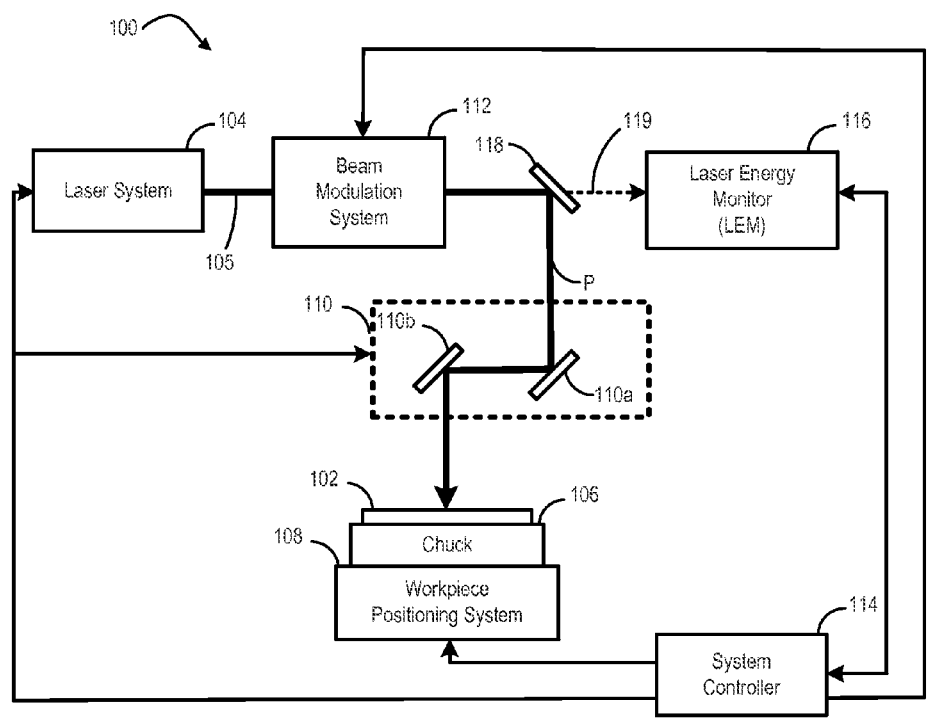
FIG. 1 schematically illustrates a laser processing apparatus according to one embodiment of the present disclosure.

Example embodiments are described below with reference to the accompanying drawings. Many different forms and embodiments are possible without deviating from the spirit and teachings of the invention and so the disclosure should not be construed as limited to the example embodiments set forth herein. Rather, these example embodiments are provided so that this disclosure will be thorough and complete, and will convey the scope of the invention to those skilled in the art. In the drawings, the sizes and relative sizes of components may be exaggerated for clarity. The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween.

As used herein, the term pulse repetition frequency or "PRF" may be specified by its inverse, the pulse period (PP) or the inter-pulse period (IPP). Typically, machine users refer to PRF, but a power control or other implementation may specify pulse period. Thus, the two terms are interchangeably used in this discussion where appropriate.

I. Example System Overview

Referring to FIG. 1, a laser processing apparatus 100 is configured to form routs and other features (e.g., through-vias, blind vias, trenches, and kerfs) within one or more materials of a workpiece 102 by directing a beam 105 of laser pulses along a path P to impinge upon the workpiece 102. Features may be formed by controlling the laser processing apparatus 100 to perform a routing action and/or other tooling actions (e.g., a percussion drilling action, a trepan drilling action, a skiving action, and a cutting action), wherein each tooling action may include one or more steps. As illustrated, the laser processing apparatus 100 may include a laser system 104, a chuck 106, a workpiece positioning system 108, a beam positioning system 110, and a beam modulation system 112. Although not illustrated, the laser processing apparatus 100 may further include one or more supplemental systems (e.g., optics, mirrors, beam splitters, beam expanders, and/or beam collimators) configured to shape, expand, focus, reflect, and/or collimate the beam 105 of laser pulses at any point along the path P. In one embodiment, a set of one or more supplemental systems may be referred to as an "optics train."

In one embodiment, the operation of one or more or all of the workpiece positioning system 108, beam positioning system 110, and beam modulation system 112 may be controlled to change the position of where the beam 105 of laser pulses impinges upon the workpiece 102 (i.e., the beam position relative to the workpiece 102). In addition, or in other embodiments, the operation of one or more or all of the workpiece positioning system 108, beam positioning system 110, and beam modulation system 112 may be controlled to change the velocity and/or acceleration with which the beam position changes relative to the workpiece 102.

The laser system 104 may be configured to generate the beam 105 of laser pulses. Laser pulses within the beam 105 may, for example, have a wavelength in the infrared, visible, or ultraviolet spectrums. For example, laser pulses within the beam 105 may have a wavelength such as 1064 nm, 532 nm, 355 nm, 266 nm, and the like. Laser pulses within the beam 105 are may generally generated at a PRF in a range from about 20 kHz to about 2000 kHz. It will be appreciated, however, that the PRF may be less than 20 kHz or greater than 2000 kHz. For example, mode-locked laser may run up to 200 MHz.

The chuck 106 may be provided as any chuck capable of suitably or beneficially supporting the workpiece 102. In one embodiment, the chuck 106 can be provided as a vacuum chuck, an electrostatic chuck, a mechanical chuck, or the like or a combination thereof.

Figure 2:
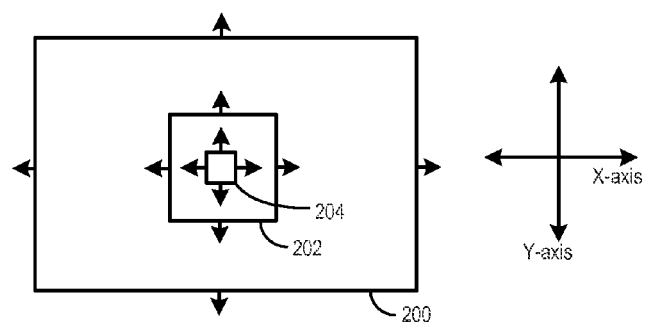
FIG. 2 schematically illustrates scan fields associated with various components or systems of the apparatus shown in FIG. 1.

The workpiece positioning system 108 is configured to translate the chuck 106, which supports the workpiece 102, along one or more directions parallel to an X-axis, Y-axis, and/or Z-axis (where the Z-axis is at least substantially perpendicular to the surface of the chuck 106, and where the X-axis, Y-axis, and Z-axis are mutually orthogonal to each other), to rotate the chuck 106 about one or more of the X-axis, Y-axis, and/or Z-axis, or the like or a combination thereof. In one embodiment, the workpiece positioning system 108 may include one or more stages configured to move the chuck as discussed above. When a workpiece 102 is supported by the chuck 106, the workpiece positioning system 108 can be operated to move or scan the workpiece 102 (e.g., along the X-axis and Y-axis) within a first scan field (e.g., first scan field 200, as shown in FIG. 2) relative to the path P. In one embodiment, the workpiece positioning system 108 can be operated to scan the workpiece 102 in any direction along the X-axis for a distance in a range from about 400 to about 700 mm (e.g., about 635 mm), in any direction along the Y-axis for a distance in a range from about 400 mm to about 700 mm (e.g., about 533 mm), or a combination thereof.

The beam positioning system 110 is configured to deflect, reflect, refract, diffract, or the like, or a combination thereof, the beam 105 of laser pulses to scan the beam position within a second scan field (e.g., second scan field 202, as shown in FIG. 2) relative to the workpiece 102. In one embodiment, the beam positioning system 110 can be operated to scan the beam position in any direction along the X-axis for a distance in a range from about 1 mm to about 50 mm (e.g., about 30 mm), in any direction along the Y-axis for a distance in a range from about 1 mm to about 50 mm (e.g., about 30 mm), or a combination thereof. Generally, operation of the beam positioning system 110 can be controlled to scan the beam position relative to the workpiece 102 at a velocity and/or acceleration that is greater than that by which the workpiece positioning system 108 can scan the workpiece 102 within the first scan field 200. In the illustrated embodiment, the beam positioning system 110 includes a pair of galvanometer-based mirrors (galvos) 110a and 110b, disposed within the path P. The galvos 110a, 110b are configured to be rotated (e.g., about the X-axis or Y-axis), thereby deflecting the path P and scanning the beam position within the second scan field 202. It will be appreciated, however, that the beam positioning system 110 may be configured in any other suitable or beneficial manner.

The beam modulation system 112 is configured to deflect, reflect, refract, diffract, or the like, or a combination thereof, the beam of laser pulses to scan the beam position within a third scan field (e.g., third scan field 204, as shown in FIG. 2) relative to the workpiece 102. In one embodiment, the beam modulation system 110 can be operated to scan the beam position in any direction along the X-axis for a distance in a range from about 0.05 mm to about 0.2 mm (e.g., about 0.1 mm), in any direction along the Y-axis for a distance in a range from about 0.05 mm to about 0.2 mm (e.g., about 0.1 mm), or a combination thereof. Those persons skilled in the art will recognize that these ranges are provided by way of example and that the beam position may be scanned within smaller or larger ranges. Generally, operation of the beam modulation system 112 can be controlled to scan the beam position relative to the workpiece 102 at a velocity and/or acceleration that is greater than that by which the beam positioning system 110 can scan beam position within the second scan field.

In one embodiment, the beam modulation system 112 includes a single acousto-optic deflector (AOD) configured to deflect the beam 105 of laser pulses to scan the beam position along a single axis within the third scan field 204. In another embodiment, the beam modulation system 112 includes two AODs, wherein a first AOD is configured to deflect the beam 105 of laser pulses and scan the beam position within the third scan field 204 along the X-axis and a second AOD is configured to deflect the beam 105 of laser pulses and scan the beam position within the third scan field 204 along the Y-axis. It will be appreciated, however, that the beam modulation system 112 may be configured in any other suitable or beneficial manner. For example, the beam modulation system 112 may include one or more acousto-optic modulators (AOMs), electro-optic deflectors (EODs), electro-optic modulators (EOMs), fast steering mirrors (FSMs) (e.g., high-bandwidth (greater than about 10 kHz) FSMs), or the like or a combination thereof in addition to, or as a substitute for, an AOD.

The laser processing apparatus 100 may further include a system controller 114 communicatively coupled to the workpiece positioning system 108, the beam positioning system 110, the beam modulation system 112, and the laser system 104. The system controller 114 is configured to control the aforementioned operation of one or more or all of these systems (the workpiece positioning system 108, the beam positioning system 110, the beam modulation system 112, and/or the laser system 104) to form features (e.g., routs, through-vias, blind vias, trenches, kerfs, and other features) within the workpiece 102. In one embodiment, the system controller 114 can control an operation of the laser system 104 to change the PRF (e.g., within a range from about 20 kHz to about 2000 kHz) of pulses generated by the laser system 104. For certain embodiments disclosed herein that use high-PRF lasers (e.g., within a range from about 200 kHz to about 500 kHz), the system controller 114 may not need to change the PRF while lasing a rout.

In one embodiment, the system controller 114 may control an operation of the beam modulation system 112 to scan the beam position relative to the workpiece 102 and form a "high feature-density region" within the workpiece 102 (e.g., a region containing features separated by a pitch of less than or equal to 500 µm, or thereabout). The system controller 114 may further control an operation of the beam positioning system 110 and/or the workpiece positioning system 108 while forming the high feature-density region.

In another embodiment, the system controller 114 may control an operation of the beam positioning system 110 to scan the beam position relative to the workpiece 102 and form a "medium feature-density region" within the workpiece 102 within the workpiece 102 (e.g., a region containing features separated by a pitch greater than 500 µm, or thereabout, such as about 1000 µm). The system controller 114 may further control an operation of the beam modulation system 112 and/or the workpiece positioning system 108 while forming the medium feature-density region.

Figure 3:
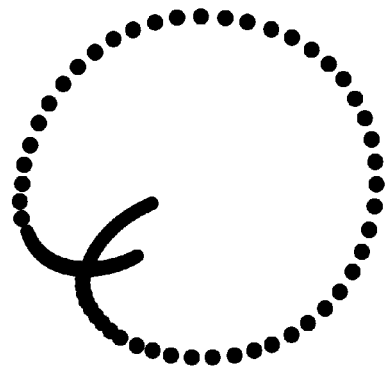
FIG. 3 and FIG. 4 graphically illustrate patterns of spots created by scanning a beam position relative to a workpiece, according to certain embodiments of the present disclosure.

In yet another embodiment, the system controller 114 may control an operation of the beam positioning system 110 and further control an operation of the beam modulation system 112 in a coordinated manner to overcome high-speed velocity limitations, small-area positioning errors, and bandwidth limitations of the beam positioning system 110. For example, if the laser processing apparatus 100 did not include the beam modulation system 112, the beam positioning system 110 could be controlled to scan the beam position relative to the workpiece 102 such that laser pulses within the beam sequentially impinge upon the workpiece 102 to form a rounded pattern of spots as shown in FIG. 3 (as shown, the circle-shaped pattern of spots has a maximum width of about 600 µm). By coordinating operation of the beam modulation system 112 with the beam positioning system 110, however, the laser processing apparatus 100 can be configured to form a square-shaped pattern of spots as shown in FIG. 4 (as shown, the square-shaped pattern of spots has a dimension of about 600 µm × about 600 µm).

Figure 4:
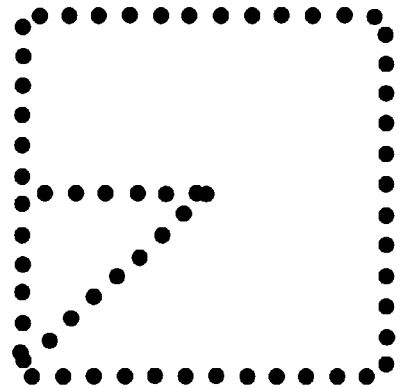
Figure 5:
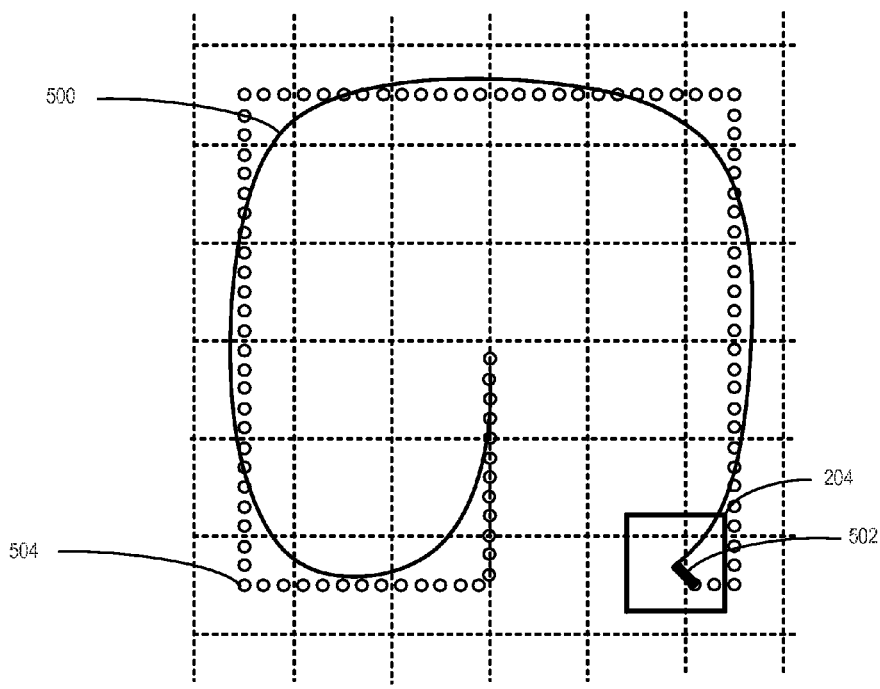
FIG. 5 is a chart schematically illustrating one embodiment of a process of forming the pattern of spots shown in FIG. 4.

In one embodiment, and with reference to FIG. 5, the pattern of spots shown in FIG. 4 can be formed by controlling the beam positioning system 110 to scan the beam position within the second scan field 202 along a line such as line 500, and the beam modulation system 112 can be controlled to further scan the beam position within the third scan field 204 (which is centered at the end of the line 500) along a direction (e.g., indicated by line 502, centered within the third scan field 204) such that laser pulses sequentially impinge upon the workpiece 102 to form a square-shaped pattern of spots 504 (e.g., such as that shown in FIG. 4). By applying the example process as discussed above with respect to FIG. 5, the beam position can be scanned over the workpiece at a rate of about 5 meters per second (m/s), or even higher, depending on the galvo capabilities. It will be appreciated, however, that operation of the beam modulation system 112 with the beam positioning system 110 can be coordinated in any manner to form any suitable or beneficial pattern of spots on the workpiece 102.

Generally, the system controller 114 can include operating logic (not shown) that defines various control functions, and may be in the form of dedicated hardware, such as a hardwired state machine, a processor executing programming instructions, and/or a different form as would occur to those skilled in the art. Operating logic may include digital circuitry, analog circuitry, software, or a hybrid combination of any of these types. In one embodiment, the system controller 114 may include a processor such as a programmable microcontroller, microprocessor, or other processor that can include one or more processing units arranged to execute instructions stored in memory in accordance with the operating logic. Memory (e.g., computer-readable medium) can include one or more types including semiconductor, magnetic, and/or optical varieties, and/or may be of a volatile and/or nonvolatile variety. In one embodiment, memory stores instructions that can be executed by the operating logic. Alternatively or additionally, memory may store data that is manipulated by the operating logic. In one arrangement, operating logic and memory are included in a controller/processor form of operating logic that manages and controls operational aspects the workpiece positioning system 108, the beam positioning system 110 and/or the beam modulation system 112, although in other arrangements they may be separate.

As described herein, the laser processing apparatus 100 is configured to enable coordinated operation of the beam positioning system 110 and the beam modulation system 112 to form features at high speed and with high positional accuracy. In certain embodiments, the laser processing apparatus 100 can further include a laser power control (LPC) system having, for example, the beam modulation system 112 and the system controller 114, as well as other systems such as a laser energy monitor (LEM) 116. Generally, the LPC system may be configured to measure the pulse energy of individual laser pulses (e.g., for quality and control purposes), control the pulse energy of individual laser pulses, facilitate rapid changes to pulse energy and PRF, coordinate the pulse energy control of individual laser pulses with beam position, coordinate generation and modulation of the laser pulses, or the like or a combination thereof.

II. Example Rout Processing Embodiments

As discussed above, when processing routs or other features, it is possible to exceed the dynamic limits (e.g., linear stage acceleration or velocity, or galvo scan field) of a compound motion system, such as the laser processing apparatus 100 shown in FIG. 1. Referring again to FIGS. 1 and 2, for example, if a tool path of a rout or other feature is within a galvo field, such as the second scan field 202, then the galvos 110a, 110b may provide sufficient beam velocity and acceleration for acceptable processing throughput. However, if the tool path of the rout or other feature is larger than the galvo field, then the stage of the workpiece positioning system 108 may need to be taken into account. Generally, in prior systems, stages have provided sufficient velocity to keep up with laser processing because maximum processing velocities are held relatively low due to power limitations of the laser system 104. As laser powers continue to increase, processing velocities can also be increased to improve throughput. However, the benefits of increased throughput provided by higher laser power may not be realized if stage velocity and acceleration limits are exceeded.

Thus, certain embodiments disclosed herein provide tool path or rout optimization by dividing laser processing commands (e.g., issued from the system controller 114 to one or more of the laser system 104, the workpiece position system 108, the beam positioning system 110, and/or the beam modulation system 112) into a series of separate "process segments" that each include information describing the beam position, PRF or pulse period, pulse energy setpoints for laser pulses, beam velocity, and other laser processing parameters, or a combination thereof. Accordingly, the system controller 114 may include a segment processing subsystem configured to filter, divide, process or otherwise convert information contained in each "process segment" into beam position commands, pulse period commands, and laser pulse energy commands.

Figure 6:
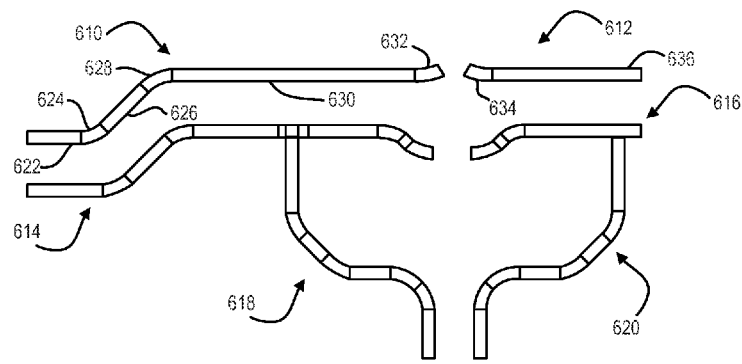
FIG. 6 schematically illustrates a plurality of rout sequences divided into process segments according to certain embodiments.

For example, FIG. 6 schematically illustrates a plurality of rout sequences 610, 612, 614, 616, 618, 620 divided into process segments according to certain embodiments. In this example, each rout sequence 610, 612, 614, 616, 618, 620 is a continuous line that is processed by turning the laser on (e.g., emitting a train of laser pulses) during the entire sequence. Laser processing may include, for example, turning the laser on at the start of a first process segment 622 of the rout sequence 610, sequentially processing the process segments 622, 624, 626, 628, 630, 632 of the rout sequence 610, turning the laser off at the end of the last process segment 632 of the rout sequence 610, turning the laser on again when the beam path reaches the start of a first process segment 634 of the rout sequence 612, sequentially processing the process segments 634, 636, and turning the laser off again at the end of the last process segment 636 in the rout sequence 612. Similarly, the laser processing includes turning the laser on and off at the beginning and end of the rout sequences 614, 616, 618, 620, respectively.

To maintain a consistent processing quality, one or more laser processing parameters may need to be adjusted from one process segment to the next (e.g., from process segment 622 to process segment 624) and/or from one rout sequence to the next (e.g., from rout sequence 610 to rout sequence 612). Further, it may be possible to increase the process speed during certain process segments. For example, the dynamic constraints of the stage may allow the linear process segment 630 to be processed at a higher beam velocity than that of the circular arc segment 628. As discussed below, changing the velocity may require a change in the PRF or other laser parameters. Thus, according certain embodiments, the system controller 114 performs an optimization routine that simulates laser processing parameters and beam positioner trajectories to determine a maximum velocity for each of the process segments. The system controller 114 then selects one or more of the determined velocities for processing each of the process segments of the rout sequences 610, 612, 614, 616, 618, 620.

Figure 7:
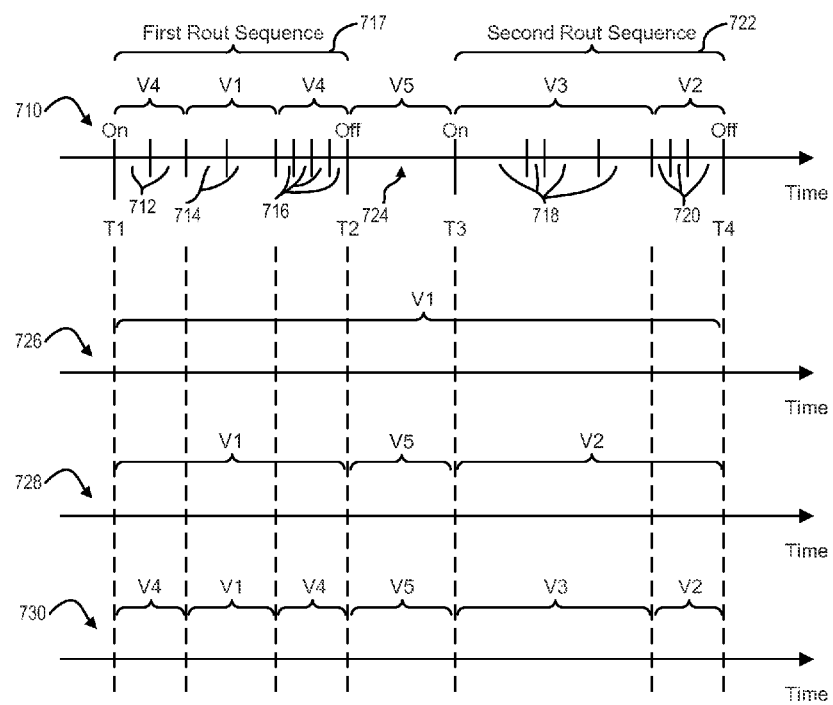
FIG. 7 schematically illustrates example time graphs of velocities selected for a plurality of process segments of corresponding rout sequences according to various embodiments.

FIG. 7 schematically illustrates example time graphs of velocities selected for a plurality of process segments of corresponding rout sequences according to various embodiments. In a first time graph 710, a first plurality of process segments 712, 714, 716 correspond to a first rout sequence 717 and a second plurality of process segments 720 correspond to a second rout sequence 722. The first rout sequence 717 is continuous and is processed by turning on a laser at time T1 and turning off the laser at time T2. Similarly, the second rout sequence 722 is continuous and is processed by turning on the laser at time T3 and turning off the laser at time T4.

As discussed above, the system controller 114 performs an optimization routine that simulates laser processing parameters and beam positioner trajectories to determine a maximum velocity V1 for process segments 712, 716, a maximum velocity V2 for process segments 714, a maximum velocity V3 for process segments 718, and a maximum velocity V4 for process segments 720. It should be noted that in other embodiments each process segment may be determined to have a different maximum allowable processing velocity, rather than multiple segments having the same maximum velocity (e.g., four consecutive process segments have maximum velocity V3), as shown in FIG. 7. A gap 724 between the first rout sequence 717 and the second rout sequence is assigned a velocity V5. Because the gap 724 represents a time when the laser is off while the beam trajectory travels from the end of the first rout sequence 717 to the beginning of the second rout sequence 722, the assigned velocity V5 may be a maximum overall system velocity so as to minimize non-laser processing time and increase throughput. In this example, V5>V4>V3>V2>V1. A maximum velocity, for each process segment and the overall system, is determined to be a velocity for which the dynamic constraints (e.g., stage velocity and acceleration) are satisfied.

A first example embodiment for selecting a processing velocity is shown in a second time graph 726. In this embodiment, the slowest velocity V1 is selected for all of the first rout sequence 717, the gap 724, and all of the second rout sequence 722. In other words, this embodiment selects the velocity of routs by simply reducing the rout velocity until all dynamic constraints are respected. This can be done, for example, by executing an optimization routine that simulates beam positioner trajectories, checks for violation of dynamic constraints, and iteratively lowers the rout velocity until all constraints are respected.

An advantage of this first rout optimization implementation is that it provides a uniform velocity setting for the entire application, which may be desirable from a process control standpoint. For any rout velocity change, the laser parameters may need to be appropriately modified. For example, it may be useful to maintain bite size (pitch between laser pulses) and dosage (accumulated laser energy per unit length) approximately equal to that of original process parameters. Some variation from these reference process parameters may be made due to the details of laser/material interaction, and the variation of laser parameter as a function of PRF (e.g. laser pulse width). Such variations can, in some cases, be programmed if the laser/material sensitivities are known. For instance, the workpiece ablation rate (removed material volume per unit of applied laser energy) may vary with pulse width. Given a mapping of laser pulse width vs. PRF, and the ablation rate sensitivity, the laser fluence can be properly adjusted (e.g., by adjusting laser power) to maintain the desired material ablation volume. Similar compensation techniques may be performed for other processing sensitivities, such as beam velocity, thermal loading, and other processing parameters.

For certain processing applications, however, a disadvantage of this approach is that some rout sequences or process segments may overly constrain the entire application. Further, certain worst-case rout sequences (e.g., a velocity reversal) may severely reduce the potential throughput of the application. Thus, in certain applications, it may be more useful to optimize the worst-case routs with a different (lower) velocity than the velocity selected for other routs that cause no constraint violations at higher speeds A second example embodiment for selecting processing velocities is shown in a third time graph 728. This second example embodiment modifies the first example shown in time graph 726 by allowing more than one processing velocity. Each continuous rout sequence 717, 722 (e.g., laser on during the entire sequence) is independently optimized. However, each of the optimized rout sequences 717, 722 is processed at a single (lowest) velocity. Thus, as shown in the time graph 728, the velocity V1 is selected for the first rout sequence 717 (where V1<V4), and the velocity V2 is selected for the second rout sequence 722 (where V2<V3).

In the second example shown in the time graph 728, to further improve throughput, the maximum system velocity V5 is selected for the gap 724 because it is assumed that V5 accounts for any necessary acceleration and/or deceleration at T2 and T3. In other embodiments, to reduce the number of velocity changes, either the velocity V1 selected for the first rout sequence 717 or the velocity V2 selected for the second rout sequence 722 is selected for the gap 724. In yet other embodiments, the gap 724 is used to transition (accelerate or decelerate) from the velocity V1 selected for the first rout sequence 717 to the velocity V2 selected for the second rout sequence 722.

The second example embodiment shown in the time graph 728 at least partially solves the throughput-limitation problem of the first example embodiment shown in time graph 726. However, some cases may still be overly restricted. For example, a single long serpentine rout, or a series of long routs with alternating velocities, can still be constrained to a lower velocity over the entire rout.

A third example embodiment for selecting processing velocities is shown in a fourth time graph 730. In this example, velocity and PRF (or pulse period) are selected on a segment-by-segment basis. Thus, as shown for the first rout sequence 717, the maximum velocity V4 is selected for the process segments 712, 716 and the maximum velocity V1 is selected for the process segments 714. Similarly, for the second rout sequence 722, the maximum velocity V3 is selected for the process segments 718 and the maximum velocity V2 is selected for the process segments 720.

In certain embodiments, each continuous rout sequence 717, 722 can be divided into smaller sub-segments of some maximum size (for instance, 0.5 mm). The endpoint of each sub-segment can be treated as a "process feature" of zero process time (since no time is spent in the transition from one sub-segment to the next), with the move time between these "features" set by the tooling velocity and segment lengths. Then, given a predefined ordering of segments, the sequence of segments can be treated like a series of distinct tooling features, and optimized with a traditional optimization process. The results of this optimization, in the worst case, can be used to set an upper bound on the velocity for an entire rout sequence. For example, as discussed above with respect to the second example shown in the third time graph 728, the process may include optimizing the rout sequence, finding the lowest velocity at any point, then setting the entire rout to that velocity. The example embodiment capable of the fastest overall processing time (the third example shown in the fourth time graph 730) assigns a unique velocity to each sub-segment. In process segments that tend to create constraint violations, the selected velocity would be lower; whereas in "safe" segments that violate no constraints, the velocity can be comparatively higher.

The process parameters (e.g., PRF and power) can then be adjusted for each unique sub-segment velocity, as noted above. In general, many ablation processes can be modeled by specifying the ratio of power/velocity for material processing, rather than fixing power and velocity. As velocity decreases, for example, this ratio can be maintained by lowering power by either lowering PE at a constant PRF, or lowering PRF and maintaining constant PE. The synchronization of pulse timing with the sub-segment boundaries is discussed below.

Note that the beam modulation system 112 includes AODs that enable instant variation of process velocity between process sub-segments required by the third rout optimization example embodiment. The ability of the AOD to deflect the beam position virtually instantly allows the beam trajectory velocity to change instantly, thus enabling arbitrary assignment of process sub-segment velocities (within the constraints of the AOD deflection range).

Figure 8:
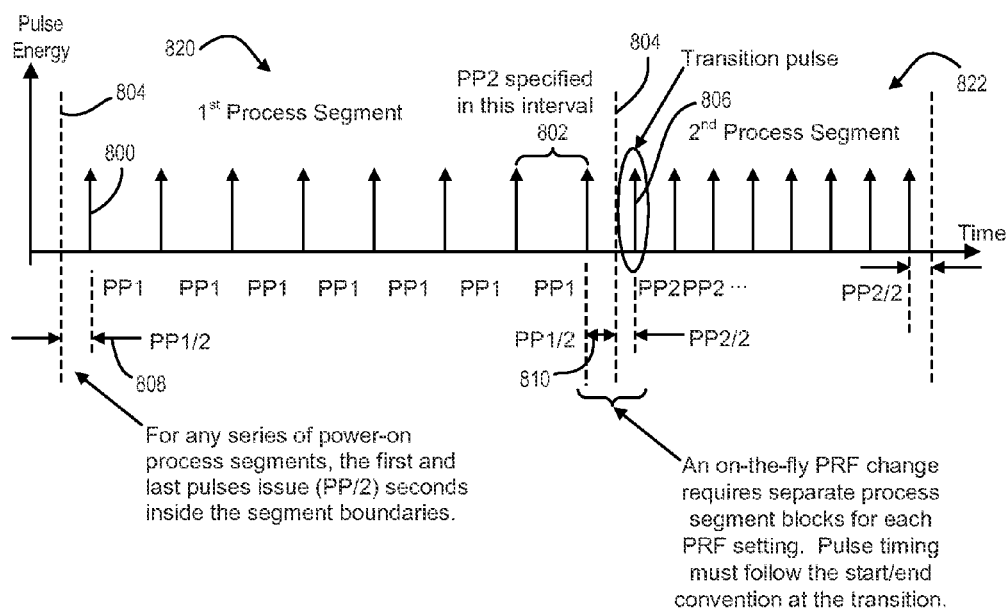
FIG. 8 schematically illustrates pulse synchronization across sequential process segments associated with different pulse periods or pulse repetition frequencies according to one embodiment.

FIG. 8 schematically illustrates pulse synchronization across sequential process segments 820, 822 associated with different pulse periods or pulse repetition frequencies according to one embodiment. The pulse period (PP) (i.e., 1/PRF) may change between process segments (e.g., between process segment 820 and a subsequent process segment 822) without a synchronization deadzone to allow "seamless" changes in the pulse period or PRF. During the transition from one pulse period to another, only the two pulse periods exist, i.e., there is no intermediate or unusually high or low pulse period between the two. This allows the laser system 104 to generate laser pulses 800 at a predictable pulse energy at any pulse period. Generally, the AOD transmission changes between the two pulse period settings to control PE of the laser pulses 800 delivered to the workpiece 102 in each process segment.

To make the transition between pulse periods (e.g., switching between PP1 and PP2) at least substantially "seamless", the system controller 114 specifies a new pulse period during the final pulse period PP1 of the process segment 820 (e.g., as designated at 802). The system controller 114 recognizes this new pulse period (e.g., PP2) and sets up the subsequent laser pulse according to this new value. The system controller 114 times this command such that the switch between PP1 and PP2 occurs at the correct time (e.g., within 1 μs).

In one embodiment, for any series of power-on segments, the first and last pulses issue (PP/2) seconds inside the segment boundaries. Thus, the timing of laser pulses relative to segment boundaries 804 is accounted for. The velocity of the beam position may change between process segments, resulting in a change in bite size for one transition pulse 806 associated with the new pulse period PP2. In another embodiment, the AOD transmission for the laser pulses generated during the new process segment 822 is established, since the new pulse period PP2 will likely change the PE of laser pulses generated by the laser system for the new process segment 822. Thus, the transition pulse 806 is generated by the laser system 104 within the appropriate process segment at the appropriate PE command (AOD transmission).

According to the pulse synchronization process of the embodiment shown in FIG. 8, the first laser pulse generated during a particular process segment is generated within an initialization period 808 (e.g., equal to one-half of the pulse period PP1 associated with the process segment 820) after the beginning of the process segment (e.g., if PP1 is 1 μs, then the initialization period is 0.5 μs). Further, the last laser pulse generated during a particular process segment is generated within a finalization period 810 (e.g., equal to one-half of the pulse period PP1 associated with the process segment 820).

Once that first pulse is synchronized, the system controller 114 is responsible for creating properly timed and located segments such that the final pulse ends at (PP/2) before the segment boundary. In certain embodiments, the segment boundary endpoints are shifted in time (accounting for the PP/2 buffer) such that the pulses actually land at the specified tool path coordinates.

If the PP varies within a series of power-on process segments, similar timing is followed for the final pulse of a first PP and the first pulse of a second PP, as shown in FIG. 8.

Certain embodiments that use a high PRF (e.g., when using mode-locked lasers running up to 200 MHz) do not provide pulse synchronization across sequential process segments, as shown in FIG. 8. Such synchronization may not be required because the high PRF substantially eliminates the concern about discrete pulses. This is likely the case when the bite size (distance between pulses) is less than about 5% to 10% of the spot size, for the highest velocity case. In certain such embodiments, a decision of whether or not to maintain the bite size is based on the laser/material interaction for the particular application.

III. Example Timing Adjustments

In certain embodiments, there are at least two timing adjustments. The first timing adjustment (which may be referred to as "AOD delay") aligns the AOD RF waveform with the issued laser pulse, and the second timing adjustment (which may be referred to as "pulse train delay") aligns the overall pulse train with the beam positioner.

Figure 9:
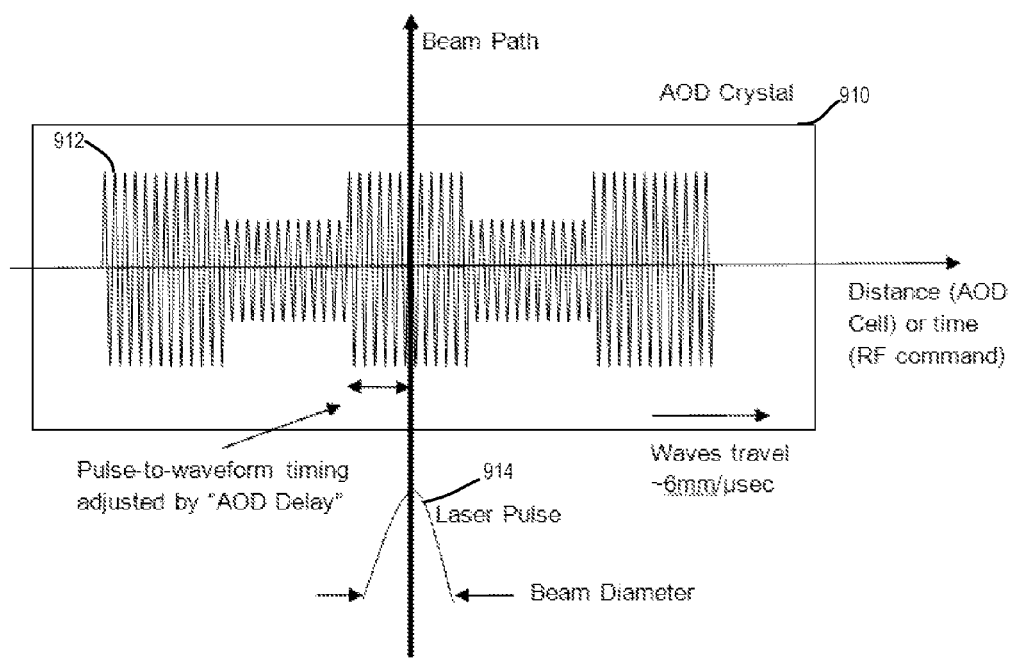
FIG. 9 schematically illustrates AOD delay timing adjustment according to one embodiment.

FIG. 9 schematically illustrates AOD delay timing adjustment according to one embodiment. An AOD crystal 910 sets up a series of traveling acoustic waves 912 that are aligned such that a laser pulse 914 passes through the center of the appropriate acoustic wave segment. In the illustrated example, the RF power changes every μsec. Note that this drawing is roughly the appropriate scale of the AOD crystal 10 and acoustic waves 912. For proper alignment, the laser pulse 914 passes through the center of the acoustic wave 912. If, on the other hand, the laser pulse 914 passes through a boundary, the laser pulse 914 will become distorted. Although FIG. 9 indicates the boundary as a change in RF amplitude, a similar effect occurs with changes in RF frequency.

In one embodiment, as suggested by FIG. 9, a method for setting up the AOD delay includes issuing a sequence with varying amplitude (e.g., sawtooth amplitude), and varying the timing until the maximum PE of the issued pulse is maximized. By definition, the AOD delay will be less than one update period (e.g., 1 μsec). In certain embodiments, this is an automated calibration procedure and may remain fixed for a given system. The timing may be sensitive to cabling, laser parameters, optical path length, and other factors.

Figure 10:
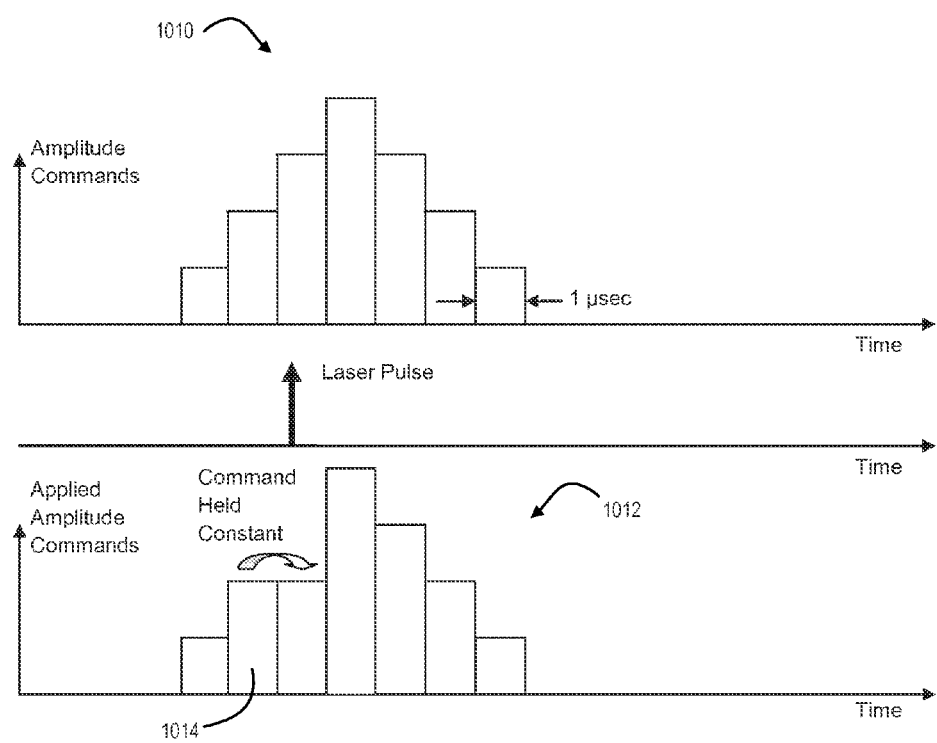
FIG. 10 graphically illustrates an amplitude command data stream according to one embodiment.

FIG. 10 graphically illustrates an amplitude command data stream 1010 stream according to one embodiment. The pulse timing discussed above may be asynchronous with the 1-μsec command data stream 1010. To account for this uncertainty, the controller according to certain embodiments holds the most recent AOD command 1014 constant until the pulse has issued, as shown in the applied amplitude commands 1012 shown in FIG. 10. The controller may have some "look-ahead" built in due to the AOD delay compensation, which is useful for implementing such embodiments.

In certain embodiments, the second delay (pulse train delay) is calibrated using an automated procedure wherein the beam positioner sweeps back and forth to create parallel lines. The delay is adjusted until the lines are aligned properly.

Laser processing of materials is sensitive to laser power, and in many applications processed by pulsed lasers, is sensitive to the pulse energy (PE) of the individual pulses. For instance, high PE is typically desirable when drilling through a copper layer, while lower PE is typically desirable when ablating a dielectric layer without heat affects (charring, melting) or damage to an underlying copper layer. In order to flexibly process such materials, methods to arbitrarily adjust the PE applied to the worksurface are used.

Traditional methods of adjusting laser power or PE include attenuation optics (such as polarization optics, or acousto-optic modulators), or direct control of laser optical output power (by varying the pump power to the lasing medium). These traditional approaches have disadvantages, including slow speed (for mechanically-adjusted polarization optics), variation in laser delivery (in the control of lasing medium pumping or Q-switch timing), or a lack of coordination with the processing operation (in all methods).

Certain embodiments coordinate the variation in power or PE with the positioning of the laser spot on the worksurface. In order to maximize throughput and process quality, coordination and control of the laser PE on a pulse-by-pulse basis may be used. In addition, it is desirable to measure the PE of each individual laser pulse in order to control PE and to monitor the process for deviations in PE which may affect the quality of the processed workpiece.

It will be understood by those having skill in the art that many changes may be made to the details of the above-described embodiments without departing from the underlying principles of the invention. The scope of the present invention should, therefore, be determined only by the following claims.

The invention claimed is:

1. A laser processing apparatus to process a continuous rout sequence comprised of a plurality of sequential process segments on or within a workpiece, the laser processing apparatus comprising:
    a laser system to generate a beam of laser pulses;
    a positioning system to scan the beam relative to the workpiece along the plurality of process segments, wherein the positioning system includes a first positioner and a second positioner each configured to scan the beam, and wherein at least one selected from the group consisting of the first positioner and the second positioner is configured to the scan the beam in at least two non-parallel directions; and
    a controller coupled to the positioning system and configured to control the laser system and the positioning system to sequentially process the plurality of process segments by directing a sequence of laser pulses to the workpiece such that the beam is scanned along one of the plurality of process segments at a beam velocity that is higher or lower than a beam velocity of another of the plurality of process segments and such that a power of the beam as it is scanned along the one of the plurality of process segments is different from to the power of the beam as it is scanned along the another of the plurality of process segments.

2. The laser processing apparatus of claim 1, wherein the first positioner includes an acousto-optic deflector.

3. The laser processing apparatus of claim 1, wherein the second positioner includes a galvanometer-based mirror.

4. A laser processing apparatus to process a continuous rout sequence comprised of a plurality of sequential process segments on or within a workpiece, the laser processing apparatus comprising:
- a laser system to generate a beam of laser pulses;
- a positioning system to cause relative motion between beam and the workpiece to thereby scan the beam along the plurality of process segments; and
- a controller configured to control the laser system and the positioning system to sequentially process the plurality of process segments by directing a sequence of laser pulses to the workpiece such that the beam is scanned along one of the plurality of process segments at a beam velocity that is different from another of the plurality of process segments, wherein the controller is further configured to:
- control the laser system to direct the sequence of laser pulses to the workpiece such that the laser pulses are directed to the workpiece at a first pulse repetition rate while the beam is scanned along the one of the plurality of process segments; and
- control the laser system to direct the sequence of laser pulses to the workpiece such that the laser pulses are directed to the workpiece at a second pulse repetition rate while the beam is scanned along the other of the plurality of process segments,
- wherein the first pulse repetition rate is different from the second pulse repetition rate.

5. The laser processing apparatus of claim 4, wherein the positioning system further includes a galvanometer-based mirror.

6. The laser processing apparatus of claim 4, wherein the positioning system includes a stage configured to move the workpiece.

7. The laser processing apparatus of claim 4, wherein the positioner includes an acousto-optic deflector, and wherein controller is configured to control the acousto-optic deflector to transmit the sequence of laser pulses such that the sequence of laser pulses directed to the workpiece at the first pulse repetition rate have the same pulse energy as the laser pulses directed to the workpiece at the second pulse repetition rate.

8. A laser processing apparatus to process a continuous rout sequence comprised of a plurality of sequential process segments on or within a workpiece, the laser processing apparatus comprising:
- a laser system to generate a beam of laser pulses;
- a positioning system to cause relative motion between beam and the workpiece to thereby scan the beam along the plurality of process segments, wherein the positioning system includes an acousto-optic deflector; and
- a controller configured to control the laser system and the positioning system to sequentially process the plurality of process segments by directing a sequence of laser pulses to the workpiece such that the beam is scanned along one of the plurality of process segments at a beam velocity that is different from another of the plurality of process segments, wherein the controller is further configured to:
- control the acousto-optic deflector to transmit the sequence of laser pulses such that laser pulses directed having a first pulse energy are directed to the workpiece while the beam is scanned along the one of the plurality of process segments; and
- control the acousto-optic deflector to transmit the sequence of laser pulses such that laser pulses having a second pulse energy are directed to the workpiece while the beam is scanned along the other of the plurality of process segments,
- wherein the first pulse energy is different from the second pulse energy.

9. The laser processing apparatus of claim 8, wherein the controller is configured to control the laser system to direct the sequence of laser pulses to the workpiece such that the laser pulses having the first pulse energy are directed to the workpiece at the same pulse repetition rate as the laser pulses having the second pulse energy.

10. The laser processing apparatus of claim 8, wherein the positioning system further includes a galvanometer-based mirror.

* * * * *